(12) United States Patent
Mengel et al.

(10) Patent No.: US 7,906,763 B2
(45) Date of Patent: Mar. 15, 2011

(54) MULTIBAND INFRARED IMAGING DEVICE

(76) Inventors: Arthur H. Mengel, Reading, PA (US);
David R. Flanders, Pottstown, PA (US)

( * ) Notice: Subject to any disclaimer, the term of this patent is extended or adjusted under 35 U.S.C. 154(b) by 0 days.

(21) Appl. No.: 12/221,410

(22) Filed: Aug. 4, 2008

(65) Prior Publication Data
US 2010/0025583 A1   Feb. 4, 2010

(51) Int. Cl.
*G01J 5/00* (2006.01)
(52) U.S. Cl. .................................. 250/338.1
(58) Field of Classification Search ............ 250/338.1, 250/338.3, 330, 353, 343
See application file for complete search history.

(56) References Cited

U.S. PATENT DOCUMENTS
5,013,902 A * 5/1991 Allard .................. 250/214 VT
* cited by examiner

*Primary Examiner* — David P Porta
*Assistant Examiner* — Faye Boosalis
(74) *Attorney, Agent, or Firm* — Zachary T. Wobensmith, III (57) ABSTRACT

A multiband infrared imaging intensifier device which includes an infrared radiation transmitting lens, for transmitting infrared radiation from an object scene onto a quantum ferroelectric copolymer detector with a chopper between them, with the detector responsive to the infrared detection to generate signal electrons which are pulled off and accelerated by an electric field onto a phosphor surface which produces photons to provide an image.

9 Claims, 6 Drawing Sheets

| n \ f | 30 | 60 | 75 | 90 | 15 |
|---|---|---|---|---|---|
| 4 | .99 | .99 | .99 | .99 | .96 |
| 6 | .95 | .98 | .99 | .99 | .84 |
| 8 | .86 | .96 | .97 | .98 | .65 |
| 10 | .74 | .91 | .94 | .95 | .48 |
| 12 | .61 | .83 | .90 | .92 | .36 |
| 14 | .49 | .75 | .81 | .86 | .27 |
| 16 | .40 | .65 | .73 | .79 | .21 |
| 18 | .32 | .56 | .65 | .72 | |
| 20 | .27 | .48 | .56 | .64 | |
| 22 | .22 | .42 | .50 | .57 | |

*Fig. 7*

| n  d | 4 | 6 | 8 | 10 | 12 | 14 | 16 | 18 | 20 |
|---|---|---|---|---|---|---|---|---|---|
| .0025 | .99 | .96 | .93 | .90 | .86 | .81 | .76 | .70 | .64 |
| .0034 | .97 | .93 | .88 | .82 | .75 | .67 | .58 | .49 | .4 |
| .0037 | .96 | .92 | .85 | .78 | .69 | .6 | .5 | .4 | .3 |
| .0042 | .96 | .9 | .82 | .73 | .63 | .52 | .4 | .29 | .18 |
| .05 | .93 | .86 | .75 | .63 | .5 | .36 | .23 | | |

*Fig. 8*

| MTF (No.1) | MTF (No.2) | lp/mm |
|---|---|---|
| 0.78 | 0.9 | 5 |
| .74 | .88 | 6 |
| .7 | .86 | 7 |
| .65 | .84 | 8 |
| .61 | .82 | 9 |
| .58 | .80 | 10 |
| .52 | .78 | 11 |

*Fig. 9*

|  | Lp/mm | LENS No.1 | LENS No.2 | Enhanced |
|---|---|---|---|---|
| For: 30Hz<br>d=42μ<br>b=4μ | 4 | .074 | .066 | .06 |
| | 5 | .095 | .082 | .07 |
| | 6 | .13 | .11 | .09 |
| | 7 | .2 | .16 | .13 |
| | 8 | .39 | .3 | .24 |
| | 9 | .64 | .47 | .37 |
| | | | See Note: | b=2μ |
| For: 30Hz<br>d=34μ<br>b=3μ | 4 | .10 | .088 | .052 |
| | 5 | .12 | .10 | .065 |
| | 6 | .17 | .13 | .086 |
| | 7 | .22 | .18 | .12 |
| | 8 | .33 | .25 | .17 |
| | 9 | .54 | .39 | .27 |
| | 10 | 1.0 | .72 | .49 |

MULTIBAND INFRARED IMAGING DEVICE

BACKGROUND OF THE INVENTION

1. Field of the Invention

This invention relates to a multiband infrared imaging device of the thermal pulse gated image intensifier type, where thermal radiation from an object scene is focused onto a quantum ferroelectric detector, which radiation causes a temperature rise and generates signal electrons, which are pulled away from the detector by an electric field, and accelerated onto a phosphor display surface of an image intensifier to produce a visible image.

2. Description of the Prior Art

It is known in the art to use a pulse gated image intensifier to provide enhanced images. Such image intensifiers have been around quite some time. These image intensifiers use the photo-emissive effect to transfer photon energy to electrons, where this energy is sufficient to allow the electrons to jump over the photo cathode's potential barrier. An electric field is used to accelerate the photoelectrons. Over the years, intensifier devices had problems due to unwanted points on the photocathode or solid-state device components. These points can become charged and cause "hot spots" on the resulting display.

The quantum ferroelectric detector (QFE) of the invention uses the original problems of intensifier dielecic barrier discharge in a controlled way. Instead of using the photo emissive effect to generate electrons, the QFE uses the pyroelectric effect to generate electrons. An electrode with a point captures the pyroelectric electrons. The electrons distribute themselves over the entire electrode to form an equi-potential surface. The electron extension point has more charge than the rest of the electrode. The electrons are on the surface of the electrode, or two atomic diameters below the surface. These electrons can be pulled away from the surface by an electric field. The surface charge density lowers the potential barrier, which allows the surface charge to be pulled away. The charged extension points replaces the photo emissive effect as the mechanism to free an electron from a surface. The multiband infrared detector device (MIRID) amplifies the pyroelectric current from each QFE detector point or element by using an electric field to accelerate the signal and noise electrons across a gap, after which they strike a phosphor screen. The phosphor screen converts the energy of the electrons into visible photons. The brightness of this screen in turn may be additionally amplified by a one stage Gen II intensifier to increase the brightness to any range of eye comfort.

SUMMARY OF THE INVENTION

A multiband infrared imaging device for enhancing the image of an object scene, which includes a thermal infrared (TIR) transmitting lens, which captures thermal (infrared) radiation from an object scene, and focuses it onto a quantum ferroelectric (QFE) detector whose spectral responsively is active over four IR bands i.e. NIR, SWIR, MIR, and TIR. The QFE thermal detector mass is subjected to a rise in temperature to form an image temperature distribution in microscopic areas and which are, due to surface morphology, separated into an array of detector element electrodes, which each have a vacuum deposited gold capped extension point. The heating and cooling of the elements generates conduction or signal electrons by using a chopper blade between the lens and detector elements to generate the temperature changes. The side of the QFE detector opposite the incoming radiation is electrically separated into an array of pyramid shaped electrodes, which have a point vacuum deposited aluminum globule extension point, with the signal electrons concentrated at the points. An electric field is provided in front of and across the extension points to pull the electrons away, and onto the aluminized surface of a phosphor screen, which converts the electrons into photons to provide an image, which can be intensified by a well known one stage Gen II Intensifier.

The principal object of the invention is to provide a multiband infrared imaging intensifier device where thermal radiation from an object scene is focused onto a quantum ferroelectric (QFE) detector, which causes a temperature rise to generate signal electrons which are pulled away by an electric field and accelerated onto a phosphor surface of an image intensifier to produce an enhanced image.

A further object of the invention is to provide an imaging device that can be used in multiple applications.

A further object of the invention is to provide an imaging device that has a high degree of resolution.

A further object of the invention is to provide an imaging device that is simple to construct, but sturdy and reliable in use.

A further object of the invention is to provide a waveband agile imaging device that can operate with multiple bands of infrared radiation.

Other objects and advantageous features of the invention will be apparent from the description and claims

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative, and that various modifications and changes can be made in the structures, and embodiments disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Figure 1:
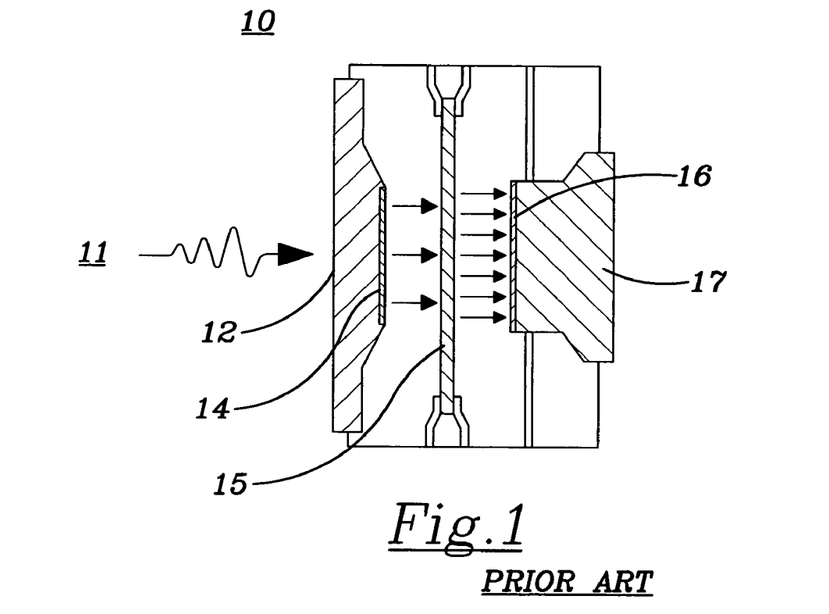
FIG. 1 is a plan view of a typical proximately focused prior art imaging device.

Preferring now more particularly to the drawings and FIG. 1 a prior art typical proximity focused image intensifier device 10 is therein illustrated. The device 10 includes a source of electromagnetic radiation 11, and input window 12, with a photocathode 14, a micro channel plate 15 (MCP) of well known type which accelerates the photons that are attracted to a phosphor surface 16, and are visible on a fiber optic window 17. Pulsed voltage is applied to the photo cathode 14, the plate 15 and phosphor 16 to provide a pulse-gated image intensifier.

Figure 2:
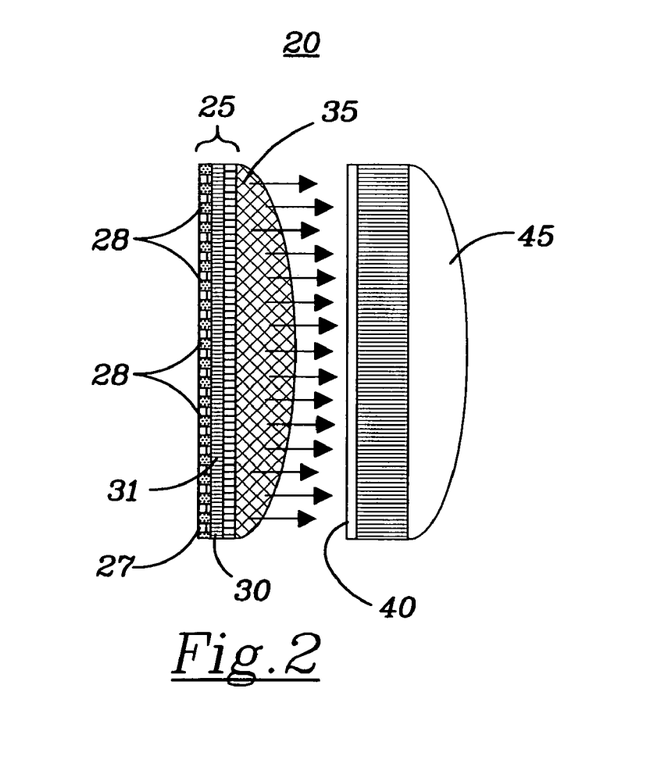
FIG. 2 is a side elevational view in partial section of the quantum ferroelectric detector array of the invention.
Figure 3:
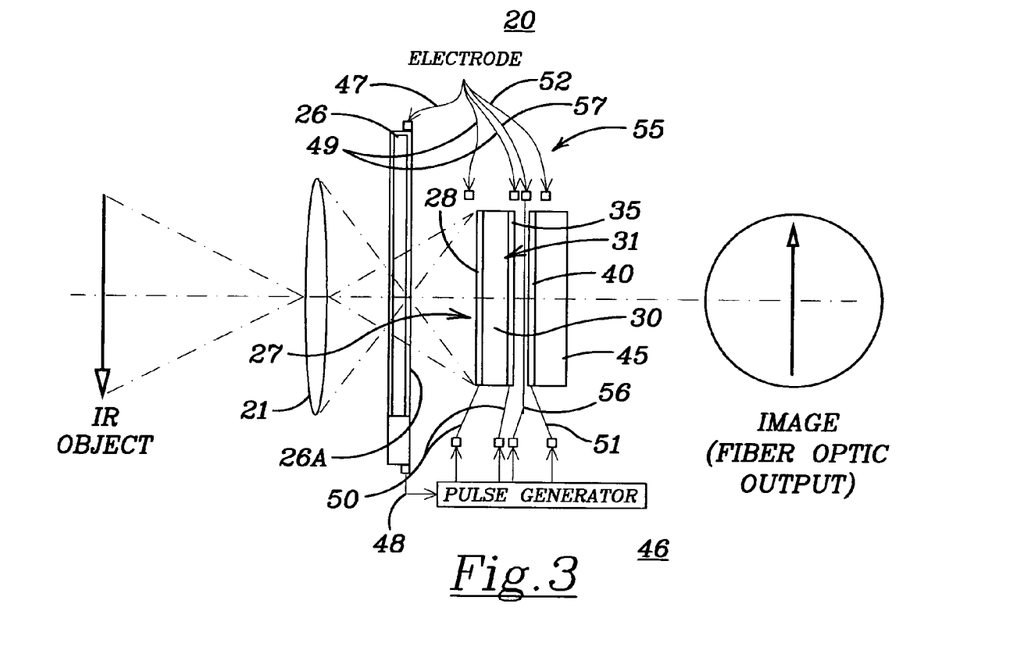
FIG. 3 is an exploded side elevational view of the pulse gated, intensified I.R. imaging device.

Referring now to FIGS. 2 and 3, one embodiment of the imagine device 20, of the invention is therein illustrated. An object scene being I.R. emissive or actively irradiated by I.R. illumination and the resulting radiation is picked up and transmitted by a GASIR infrared optic lens 21 of well known type, (which is of the thermally transmitting infrared (TIR) type) onto a quantum ferroelectric (QFE) detector 25 to be described. A chopper 26 is placed between the infrared radiation transmitted by the lens 21 and the front surface 27 of the QFE detector 25. The surface 27 has a plurality of gold (AU) vacuum deposited micro dots 28 thereon as shown in FIG. 3 to form an array.

The detector 25 is comprised of a thin film membrane of ferroelectric material 30 adjacent to the AU microdot layer 28 coating the input surface 27 and Al textured layer 35 coating the output surface 31, which is responsive to multiband thermal radiation. The quantum ferroelectric material 30 is capable of responding to four active spectral infrared radiation bands. The four bands are near infrared (NIR), short wave infrared (SWIR), midrange infrared (MIR), and thermal infrared (TIR). Multiband infrared radiation can be utilized in the image intensifier device 20 described herein, which has many applications for military and civilian use in surveillance, particularly for camouflage detection and in low light and foggy or smoky conditions, when it is desired to view an object scene without using visible light. The quantum ferroelectric material used for thermal radiation responsively is available from ELF, Attochem and Thompson, CSF, or other well known material.

Figure 5:
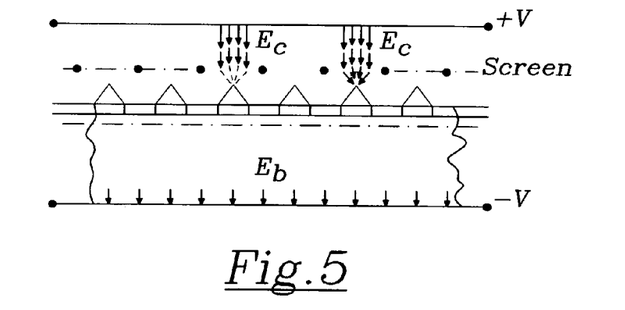
FIG. 5 is a graphic view of the dielectric barrier discharge field open window type.
Figure 6:
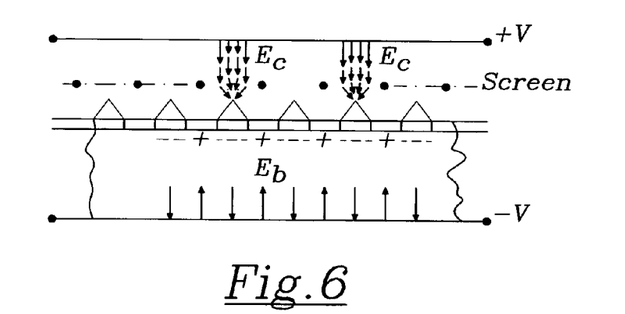
FIG. 6 is a view similar to FIG. 5 but of the closed window variety.

One objective of developing a thin film copolymer detector is low cost. Higher performing detectors, made from various ceramic ferroelectric materials, have to be reticulated in order to reduce lateral heat transfer. In addition, these detectors are rather thick (35 microns) which limits their pyroelectric performance. The QFE families of copolymer materials are pyroelectric, but with pyroelectric coefficients lower by a factor of 1.5 compared to Tri Glycine Sulfide (TGS). These copolymers would seem to be less useful for high performance thermal imaging. However, their lower pyroelectric coefficient is offset by the fact that they can be spin cast very thin. The electric signal is inversely proportional to the detector's thickness. In addition, these firms have comparatively low thermal conductance. This may be the most important characteristic, as their lateral heat transfer limits thermal detectors without reticulation. Thin film QFE copolymers have excellent performance from a heat transfer viewpoint without reticulation. In order to use thin film copolymers for high performance imaging, the material must be selected for high pyroelectric coefficient. When the dielectric constant is plotted vs. operating detector temperature, it can be seen that a higher operating temperature generates a higher pyroelectric coefficient. But it also generates a higher loss factor for the detector. The detector signal-to-noise ratio does not change. As a result, there has been very little interest in operating the detector at a higher temperature. The process of Dielectric Barrier Discharge requires signal electrons on the point of an extension. The more electrons, the easier it is to pull them away from the extension point by an electric field. So, for the detector of the invention, it is useful to operate the detector at a higher temperature. Research has found that the copolymer film (72/28 mole % vinylidene diflouride-trifluoroethylene) with propriety metallization has the highest pyroelectric coefficient. Referring to FIGS. 5 and 6 performance of a particular film is illustrated. This type of film has been made with a thickness less than 20 microns.

Operating this detector at 65 C shows a pyroelectric coefficient of $$P = 3 \times 10^{-7} \frac{coul}{cm^{2\circ} C.}$$

In the MKS system $$P = 3 \times 10^{-3} \frac{coul}{m^{2\circ} C.}$$

This is a comparatively hefty signal, but at the cost of a higher operating temperature. There is no problem encountered for operating at the higher temperature. Considering the pyroelectric curve again, a factor of 100 in signal strength is obtained by operating at a higher temperature. From this curve, the following coefficients can be used for calculations:

| at 65° C. | $p = 3 \times 10^{-3} \frac{coul}{m^{2\circ} C.}$ |
| --- | --- |
| at 60° C. | $p = 8 \times 10^{-4}$ |
| at 50° C. | $p = 1 \times 10^{-4}$ |
| at 30° C. | $p = 3 \times 10^{-5}$ |

A value of $8 \times 10^{-4}$ will be used for calculations, and an operating temperature of 60° C. will be assumed.

The QFE thermal detector mass upon bombardment of thermal radiation upon movement of the chopper 26 is subjected to a corresponding rise in temperature (ΔT), in microscopic areas to form an image in the form of a temperature distribution. The microscopic areas of the detector 25 are electrically separated into an array of electrodes, (not shown) called detector elements. Each electrode heats up according to the focused radiation absorbed by the electrode. Each electrode actually is a capacitor with two electrodes and a pyroelectric material between the electrodes (not shown). The heating or cooling of the pyroelectric (QFE) material generates conduction electrons that are called signal electrons. These electrons are generated only if the pyroelectric material changes its temperature. Each electrode will have conduction electrons in proportion to its own change in temperature. The chopper 26 is used before the detector 25 to generate a change in temperature on each detector element (not shown). Each gold tipped detector electrode sees the back side of 26A of the chopper blade 26 which establishes the initial temperature. When the chopper 26 is moved to allow scene radiation to fall on the micro dots 28 of detector 25, each electrode changes its temperature relative to the chopper blade 26 temperature. This temperature change generates conduction electrons.

The back side 31 of the detector 25 array, or the side opposite the incoming radiation is electrically separated into an array of pyramid shaped electrodes (not shown). A point, vacuum deposited Aluminum globule, or extended surface 35 is developed at the center of each electrode (not shown) and electrically connected to it. When free electrons are generated by the temperature change of the element, (not shown) they become distributed across the electrode, and its surface extension point 35 to form an equipotential surface. From electrostatic considerations, most of the electrons will reside near the extension point 35. The extension points 35 are separated from a phosphor coated surface 40, which is at a different electrical potential than the QFE and causes the electrons to accelerate and strike the phosphor surface to provide photons and create an image. The phosphor surface 40 is on a fiber optic screen 45 which transmits the image.

An electrical pulse generator 46 is provided of well known type, which is connected to chopper 26 by wires 47 and 48, to the micro dots 28 by wires 49 and 50, and to phosphor surface 40 by wires 51 and 52. The pulse generator 46 provides electrical pulses to operate the chopper 26, to charge the micro dot 28 array, and to energize the phosphor surface 40.

As shown in FIG. 3 an optional metal mesh screen 55 may be provided to assist in the acceleration of the electrons from the extension points 35, which screen is connected to the pulse generator 46 by wires 56 and 57.

The applying of an electric field simultaneously to the extension points 35 is termed "Dielectric Barrier Discharge" (DBD) which instead of scanning by an electron beam provides an improved image by reading all elements simultaneously, producing a photon response when energizing the phosphor surface.

Dielectric Barrier Discharge is defined as the pulling away of electrons from a point that has been charged by some mechanism. From electrostatic considerations, most of the charge is drawn to the point. The distribution of electrons over the entire metal extension and point creates an equipotential surface. When an extension with a point is placed in an electric field, parallel to the extension axis, the value of the field is greatest at the point and parallel to the extension axis. This means that extracted electrons will travel from the extension point in the form of a beam. Experiments have shown that the charge transfer efficiency is greater than 99%. Dielectric Barrier Discharge (DBD) is not cold cathode emission. Cold cathode emission is non-linear with both electric field and work function. The difference between Dielectric Barrier Discharge and cold cathode emission is obvious from the required electric fields. Dielectric Barrier Discharge is the preferred mechanism for discharging an array of charged extensions.

Figure 4:
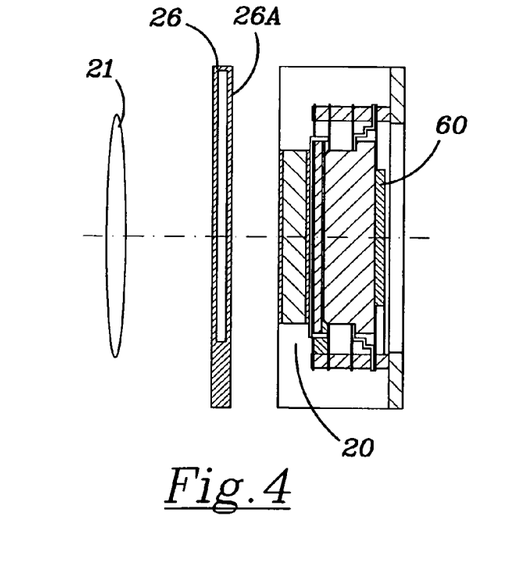
FIG. 4 is a side elevational view of the imaging device with a second generation image intensifier.

Referring now to FIG. 4, the imaging device 20 is as described for FIGS. 2 and 3, however a charge coupler device (CCD) 60 of well known type is bonded to the fiber optic screen 45, which is a second generation intensifier, which is a direct view device for firefighting or large area missile detection applications.

When the chopper blade window is open, the detector array heats up and generates electrons for "Dielectric Barrier Discharge" (DBD). The back side signal can be obtained by switching the polarization direction of the ferroelectric. Referring to FIGS. 5 and 6, details of the switching follow.

Electrostatic fields are used for switching. Consider an extension/electrode in an electrostatic field.

The $E_c$ field indices a negative charge, therefore the areas away from the extension point must be positive. It must be understood that the induced electrons are not free for Dielectric Barrier Discharge. The extension/electrode looks like an electric dipole from a distance. The field of the interface is: $E=8.9\times10^4\,E_c$. This field has to be compared with the biasing field for the QFE, which is $5\times10$ v/cm. The influence of the Dielectric Barrier Discharge field on switching is insignificant. As shown in FIG. 5, the open window operation has field $E_b$ and $E_c$.

The biasing field $E_b$ induces charge in the extension as well as the Dielectric Barrier Discharge, field $E_c$. The mesh shields the thin film from $E_c$ so that the QFE is in its insulative state. When the elements heat up, electrons are released at the interface.

As shown in FIG. 6, the closed window operation has the field $E_b$ and $E_c$ after the ferroelectric has been switched. In this state, the electrodes are cooling and the pyroelectric coefficient is negative. This means physically that the change in polarization due to the cooling is in the direction of the biasing field. FIG. 6 shows that electrons are generated for Dielectric Barrier Discharge.

Thermal calculations for the QFE Detector 25 are based on the teachings of the publication, "*Fundamental Noise Limits of Thermal Detectors*", by Lynn Garn of NVL. A detector cools by radiative heat exchange between the detector and its surroundings and heat transfer by conduction. Since there are no electrical leads, there is insignificant heat loss due to this effect. The heat loss to the metal ring holding the electrodes affects only the electrodes on the outside of the detector array. Therefore, it is assumed that radiative loss, thermal conduction through the detector, and a small loss through the connective structure are the heat transfer mechanisms. Due to the reduction in heat loss, good performance is expected. One of the advantages of the QFE is its anticipated low cost. Performance vs cost may be an important trade for a particular application. For example, the thermal lens can be a good lens or an excellent lens. The increase in performance for the excellent lens may or may not be worth the cost. The QFE can be operated under the open window only condition or it can be operated under both open and closed window conditions. The increase in performance may be worth the increase in cost. There are many different applications for the QFE. The military has requirements for long range detection. This requirement translates to high sensitivity. For NVG Goggle type applications and automobile applications, the requirement is for more resolution. Sensitivity is not as important as for long range requirements. It is possible to trade off sensitivity for resolution or vice versa by changing the detector dimensions and chopping frequency. Thermal calculations are described by Garn and will show the effect of trading sensitivity for resolution.

Figure 7:
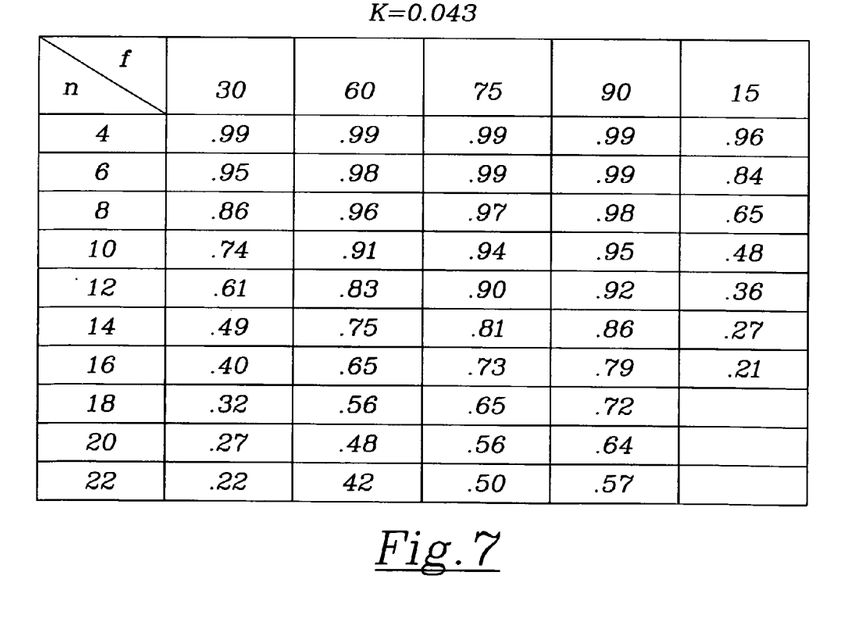
FIG. 7 is a chart of the loss in image contrast of the device due to heat spread.

FIG. 7 shows the loss in contrast due to heat spread.

Figure 8:
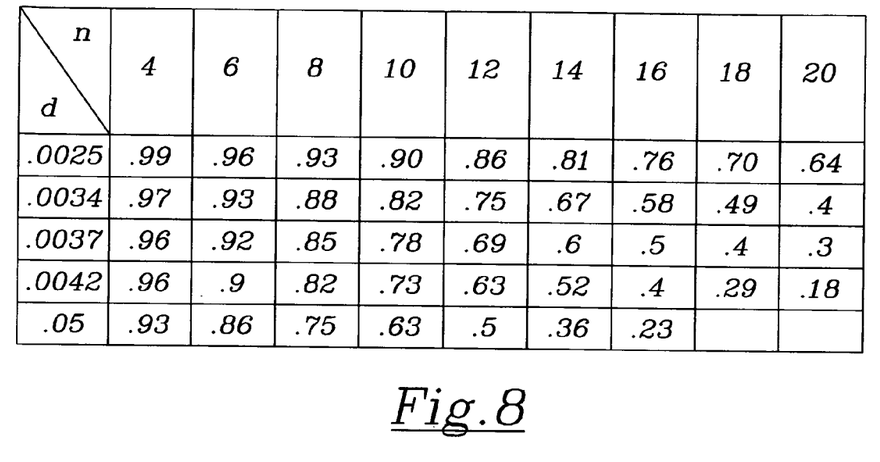
FIG. 8 is a chart of the geometrical degradation of thermal signal for an array of detector elements.

FIG. 8 shows the geometrical MTF of an array of detector elements.

Figure 9:
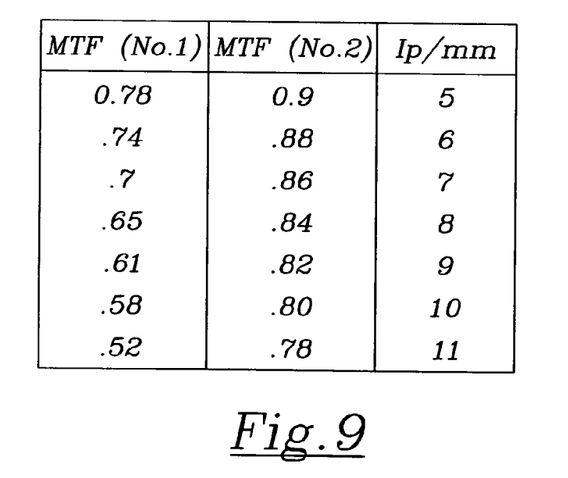
FIG. 9 is a chart of the degradation of thermal signal (MTF) with a good lens and an excellent lens.

FIG. 9 is a table of results for the lens MTF for a good lens and an excellent lens.

Figure 10:
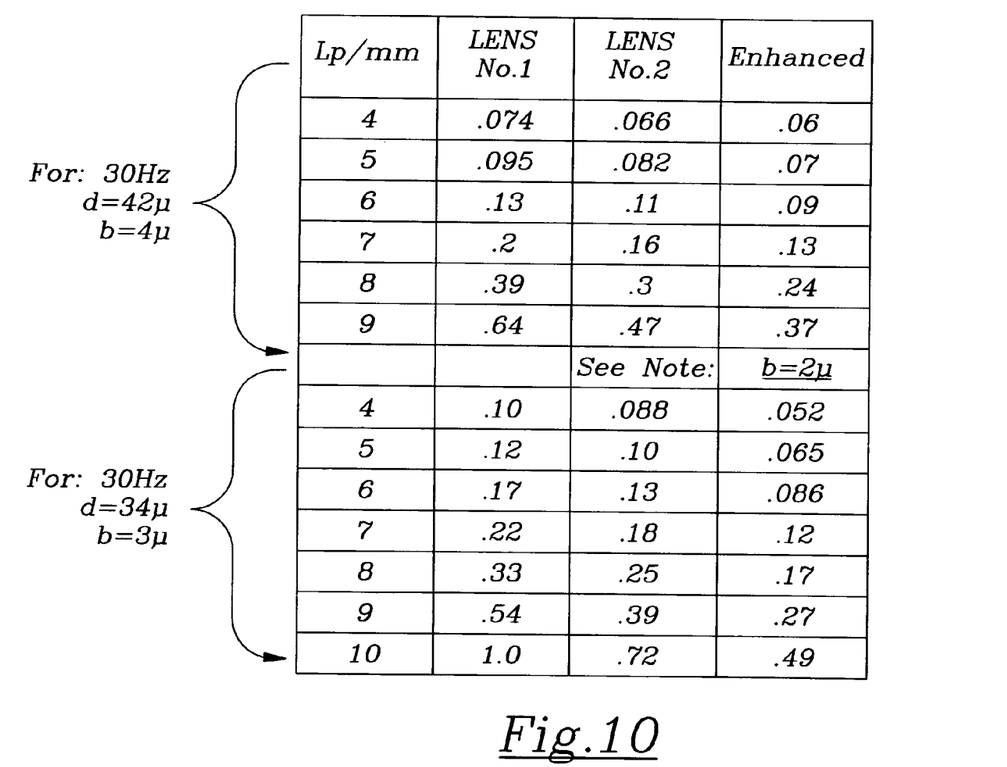
FIG. 10 is a performance comparison table for degradation of the thermal signal for various lenses.
Figure 11:
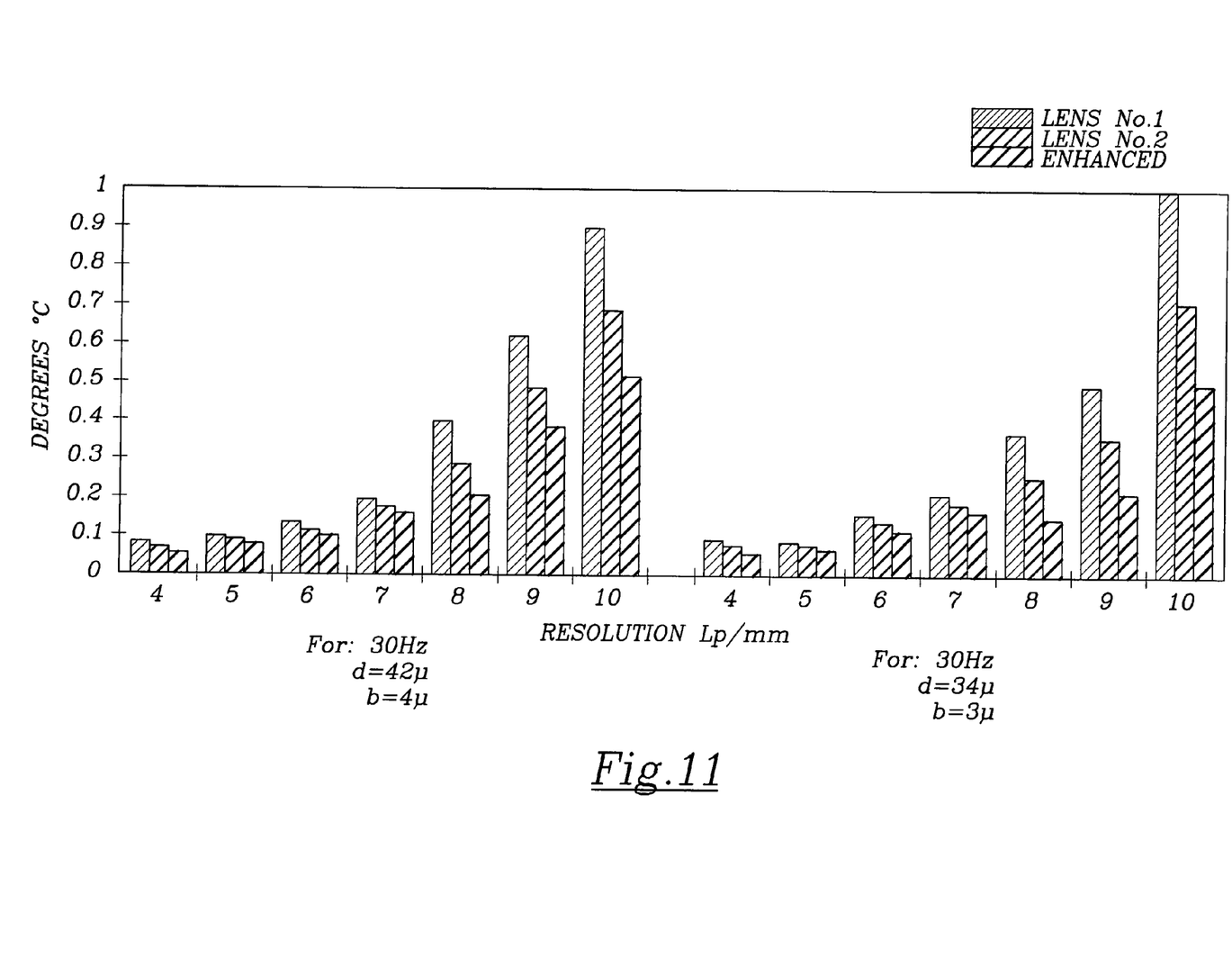
FIG. 11 is an illustration of the performance of the device of FIG. 10.

Referring to FIGS. 10 and 11, infrared engineers use Minimum Resolvable Temperature (MRT) as a measure of thermal system performance. MRT uses an experienced observer to resolve a bar chart on the display of the system under test. The MRT test is the best that the observer can do. Fred Rosell of Westinghouse and others established that an observer's performance can be correlated to the signal-to-noise on the display, (S/N). The performance for (S/N) is not the same as MRT. MRT is the best an observer can do while (S/N) is related to a probability of detection. Rosell established that for a 100% contrast image on the display, a 0.5 probability of detection requires (S/N)=1.20/. For a contrast less than 100%, Rosell suggests that the contrast be divided into 1.20 in order to obtain the increased (S/N) for the lower contrast, and that this procedure gives a pessimistic probability of detection.

QFE performance is based on (S/N) considerations. The contrast on the display is calculated from the system MTF. This contrast is divided into 1.2 to obtain the required (S/N) for 0.5 probability of detection. A Rosell curve showing the probability of detection for a lower (S/N) is used to determine ultimate QFE performance as compared to MRT experiments. An MRT trained observer has a long time to detect a bar chart in the middle of his display. It is reasonable to assign a (S/N) for 0.1 probability of detection as the required (S/N) for MRT detection. Using this criterion, QFE performance can be compared to published MRT data for competitive systems.

The MRT curves of FIGS. 10 and 11 show performance from a thermal viewpoint. Electrical calculations show that for lower $\Delta T$, the number of electrons for Dielectric Barrier Discharge decreases. At lower spatial frequencies, a $\Delta T=0.1°$ C. is very good performance and will satisfy most civilian requirements and many military requirements. MRT values below $\Delta T=0.1°$ C. are plotted but actual performance is probably closer to $\Delta T=0.1°$ C. The MRT curve at lower frequencies should flatten out.

The enhanced data with $b=2\mu$ represent the best performance for 30 Hz operation. The MRT curve representing lens f/1 with no enhancement is low technical risk performance for the selected parameters.

The MRT curves are calculated curves. However, the input data are based on published information, where conservative values have been chosen. The models used for performance-calculations are well known and accepted in the art. The MRT results are truly impressive when performance and cost are considered. An MRT curve for a pyroelectric vidicon is given for comparison. This is the best curve taken from the Infrared Handbook. The worst performing QFE for the selected parameters is significantly better than the vidicon both in sensitivity and resolution. Furthermore, the QFE will have much better image quality.

It will thus be seen that a multiband infrared imaging device has been described with which the objects of the invention are achieved.

We claim:

1. A multiband infrared imaging device for transmitting infrared images, and intensifying the image in combination with a pulsed electric source, which comprises:
    an infrared transmitting lens connected to said electric source for transmitting infrared radiation from an object scene;
    infrared radiation detection means connecting to said electric source onto which said infrared radiation is focuses;
    chopper means connected to said electric source between said lens and said detection means for controlling the infrared transmission;
    said radiation detector means has an input surface with a plurality of vacuum deposited gold micro dots thereon;
    said radiation detection means has a layer of a quantum ferroelectric copolymer under said gold micro dots, said layer is connected to said electric source under said gold micro dots, said layer is connected to said electric source, and responsive to infrared radiation;
    said quantum ferroelectric copolymer upon bombardment by said infrared radiation is caused to rise in temperature;
    said detection means has a plurality of pyramid electrodes with extension points, whereby electrons are generated in said quantum ferroelectric copolymer and gather at said extension points;
    electric field means are provided connected to said electric source adjacent said extension points to pull said electrodes off said points and accelerated them;
    an aluminized surface of a phosphor means is provided connected to said electric source adjacent said points, onto which said electrons are deposited, wherein said phosphor converts said electrons into photons and provides an image.

2. A multiband infrared imaging device as defined in claim 1 in which said infrared radiation band is a near infrared band.

3. A multiband infrared imaging device as defined in claim 1 in which said infrared radiation band is a short wave infrared band.

4. A multiband infrared imaging device as defined in claim 1 in which said infrared radiation band is a thermal band.

5. A multiband infrared imaging device as defined in claim 1 in which said infrared radiation band is a thermal band.

6. A multiband infrared imaging device as defined in claim 1 in which said electric field means is a wire mesh connected to said pulsed electric source.

7. A multiband infrared imaging device as defined in claim 1 in which, said phosphor means has a fiber optic surface.

8. A multiband infrared imaging device as defined in claim 1 in which, said an image intensifier is attached to said fiber optic screen.

9. A multiband infrared imaging device as defined in claim 8 in which said image intensifier is a charge coupler device.

* * * * *